July 28, 1942.  A. N. IKNAYAN  2,291,227
APPARATUS FOR PERFORATING RUBBER SHEETING
Filed July 13, 1940  4 Sheets-Sheet 1

INVENTOR.
ALFRED N. IKNAYAN
BY
ATTORNEYS.

INVENTOR.
ALFRED N. IKNAYAN
BY Lester J. Budlong
ATTORNEYS.

July 28, 1942. A. N. IKNAYAN 2,291,227
APPARATUS FOR PERFORATING RUBBER SHEETING
Filed July 13, 1940 4 Sheets-Sheet 3
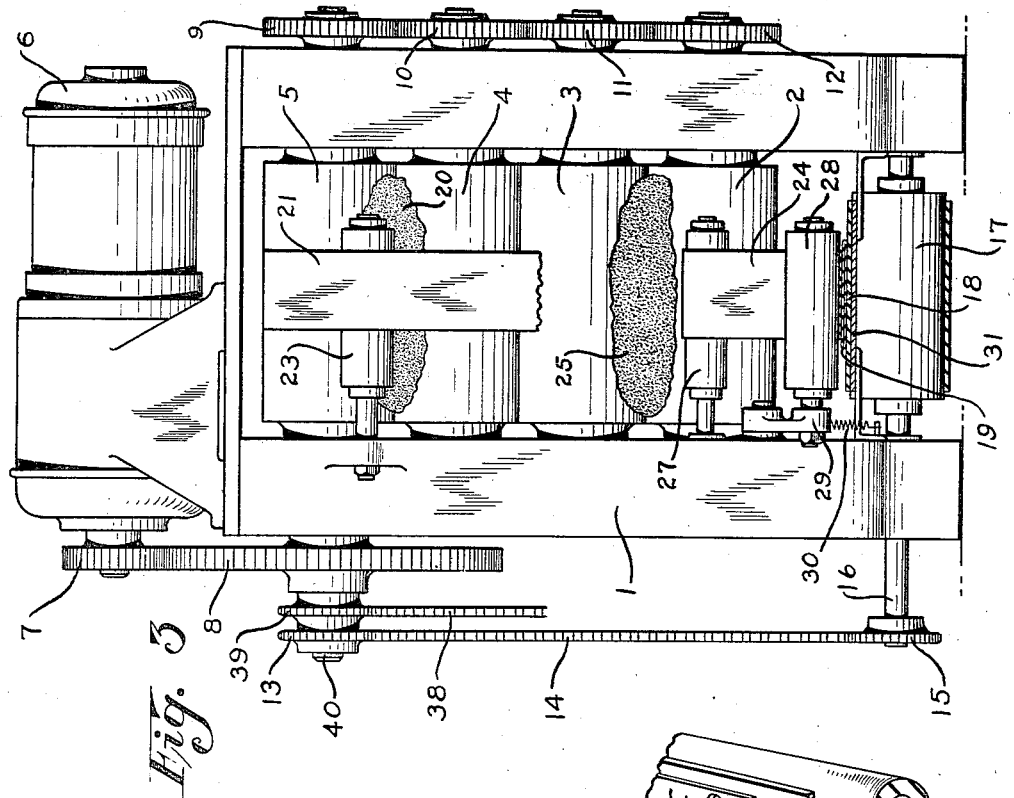
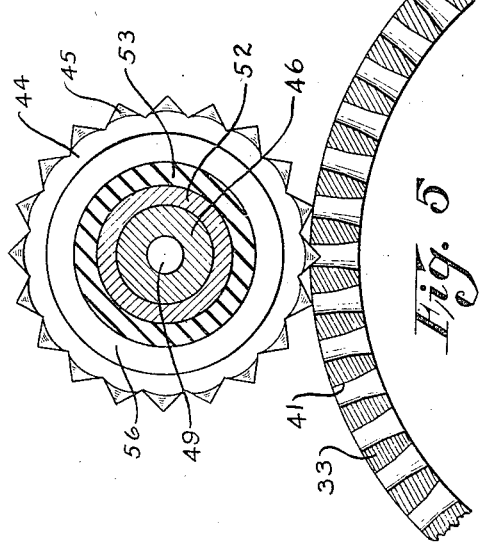
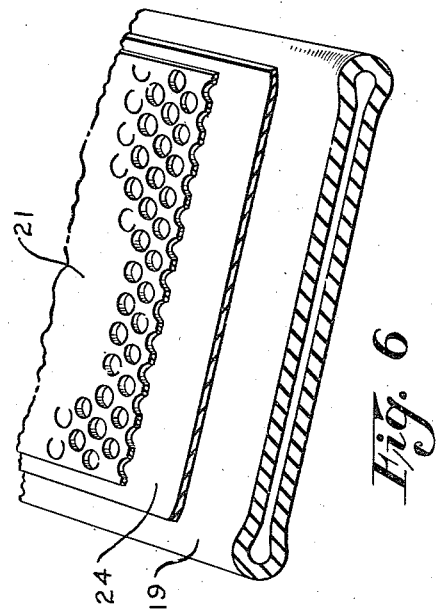
INVENTOR.
ALFRED N. IKNAYAN
BY
ATTORNEYS

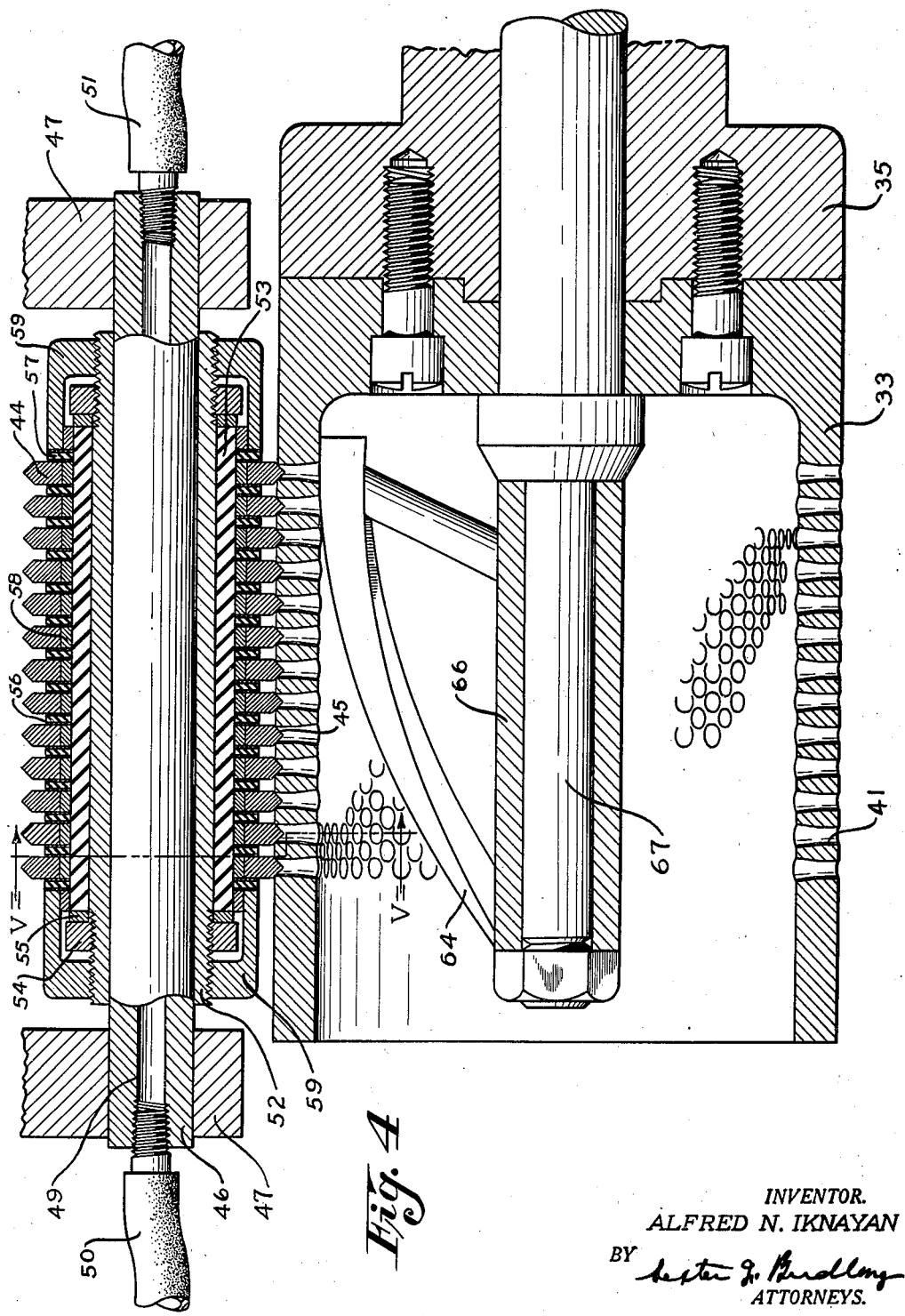

Patented July 28, 1942

2,291,227

UNITED STATES PATENT OFFICE 2,291,227

APPARATUS FOR PERFORATING RUBBER SHEETING

Alfred N. Iknayan, Indianapolis, Ind., assignor to United States Rubber Company, New York, N. Y., a corporation of New Jersey Application July 13, 1940, Serial No. 345,268

12 Claims. (Cl. 164—99)

This invention relates to an apparatus for perforating rubber sheeting or rubber strip material and is particularly applicable for perforating unvulcanized rubber compositions or other plastic strip material.

Heretofore in the manufacture of perforated rubber material in elongated sheets or strips having a plurality of laterally and longitudinally spaced apertures formed therein, much difficulty has been encountered in providing satisfactory means for properly forming sharp or clean-edged perforations in the material. For example, where a considerable number of perforating members were rigidly mounted on a single member for cooperation with complementary apertures in a work support for forming apertures in the strip material positioned therebetween, even slight inaccuracies in the lateral or longitudinal spacing of the perforating members relative to the spacing of the complementary apertures in the work support, or slight irregularities in the lengths of the perforating members, often gave improper or incomplete engagement of the members with the peripheral or shearing edges of the respective apertures and thus failed to properly and completely sever the rubber material and form the perforations desired.

My invention, however, substantially eliminates these difficulties of perforating devices of former construction by providing a perforating apparatus which employs a plurality of individually rotatable perforating rollers having the ability of adjusting themselves individually in relation to individual apertures in a work support. Essentially the invention contemplates yieldable means for supporting the perforating rollers in relation to an apertured rotatably mounted work support and includes means for adjustably varying the resistance offered by the yielding means to deviations of the perforating rollers from their normal positions. Automatic means is also provided in the apparatus for ejecting therefrom stock severed from the strip material during continuous operation of the apparatus.

Among the objects of my invention are, to provide means for insuring complete perforating of material during operation of a multiple perforating unit; to provide in a multiple perforating unit a uniform treatment of individual perforations; to provide automatic means for ejecting from the unit stock removed in the perforating operation; and, to provide a perforating unit which is readily applicable for continuous operation. Other objects and advantages will appear more fully in the following detailed description. Reference may be had to the accompanying drawings in which:

Fig. 3 is an end elevational view, partly in section, taken substantially along section line III—III of Fig. 1;

Fig. 4 is an enlarged view, in section, of perforating means, taken substantially along section line IV—IV of Fig. 2;

Fig. 5 is a detailed sectional view of the perforating means taken substantially along section line V—V of Fig. 4; and Fig. 6 is a perspective view, partly in section, of a portion of an inner tube, illustrating an application of a perforated strip of rubber composition.

An example of the use of a perforated strip of rubber composition, in its application to an inner tube for the purpose of rendering the inner tube tear-resistant, is described in my recent Patent Number 2,198,008, issued April 23, 1940.

Figure 2:
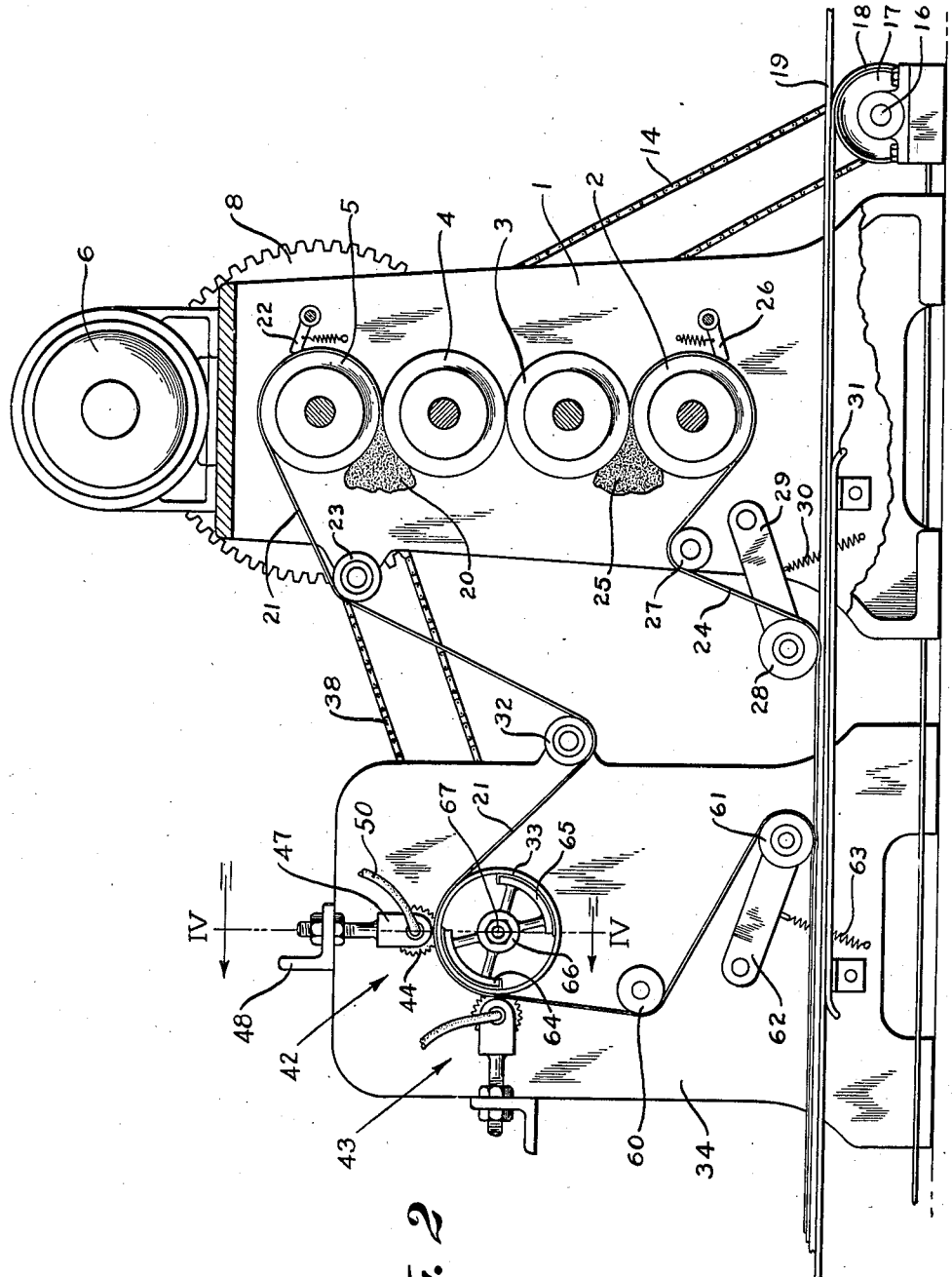
Fig. 2 is a side elevational view thereof, partly in section.

The drawings of the present invention illustrate an embodiment of a perforating apparatus in combination with continuous operating means for producing rubber strip material, perforating the material, and applying it to an inner tube. In detail the drawings, and in particular Fig. 2, show a four-roll calender, comprising essentially a frame 1 and rolls 2, 3, 4, and 5. These rolls are positively driven from a combination motor and speed reducing unit 6 mounted on top of the calender frame 1. The unit 6, through gears 7 and 8 (Fig. 3) drives the calender roll 5, and a chain of gears 9, 10, 11 and 12 keyed to the rollers 5, 4, 3 and 2, respectively, for causing rotation of all the rolls simultaneously.

A sprocket 13 associated with the gear 8 and communicating through a chain 14 drives a sprocket 15 keyed to a shaft 16 for the purpose of driving a conveyor roll 17. An endless belt 18 looped around the roll 17 forms a conveyor surface. In the present illustration of the invention, inner tube stock 19 moves along with the conveyor while subsequent operations are performed thereon. Rubber stock 20 (Fig. 2) is placed between the bite of the rolls 4 and 5 to form a strip 21 of unvulcanized sheet rubber. A pair of laterally spaced knife blades 22 pressing against the surface of the roll 5 slits the stock as it passes around the roll 5 for forming the strip material 21 of uniform width. A guide roller 23 rotatably mounted on the frame 1 positions the stock 21 in a proper path for subsequent operations.

The present illustration includes the application of a secondary strip of rubber 24 to the inner tube stock 19 prior to the application of the strip 21. The strip 24 is formed by placing rubber stock 25 between the bite of rollers 2 and 3, while a pair of laterally spaced knife blades 26 pressing against the roller 2 functions to cut the strip 24 to the proper width. From the roller 2 the strip 24 passes around an idler roll 27 rotatably mounted on the frame 1, from whence the strip is moved into position against the inner tube 19 by means of a pressure roller 28. The roller 28 is rotatably mounted on an arm 29 pivotally connected to the frame 1. A spring 30 maintains the proper pressure of the roller 28 against the inner tube 19. In order to support the conveyor belt 18 against the pressure exerted by the roller 28, a plate 31 secured to the frame 1 is positioned to permit the conveyor belt 18 to slide thereover.

As the strip 21, which is to be perforated, leaves the roller 23 it moves around a guide roller 32 which positions the strip 21 in proper relation with respect to a perforating shell 33. The roller 32 is supported by a frame 34, while the perforated shell 33, as shown in Fig. 4, is connected to a hub 35 mounted in a bearing 36 (Fig. 1) forming part of the frame 34. Keyed to the hub 35 is a sprocket 37 which, through a chain 38, connects with a sprocket 39 located on a free end 40 of the roller 5, which end also serves as a support for the driving gear 8. Thus it will be seen that the shell 33 rotates continuously throughout the perforating operations. A plurality of apertures 41 (Fig. 4) formed through the wall of the shell 33 provide the location or pattern for the formation of the apertures or perforations to be formed in the strip 21. Preferably these apertures 41 flare out or become larger as they extend in a direction toward the radial center of the shell 33.

In cooperative relationship with the shell 33 are one or more perforating units. The present illustration shows two such units 42 and 43 (Fig. 2) in staggered relation to each other so as to form alternate longitudinal rows of perforations in the strip 21. These units are identical and, therefore, only one of such units will be described.

The perforating unit 42 or 43 comprises essentially a plurality of punch carriers in the form of wheels or discs 44 shown, in particular, in Figs. 4 and 5. Each of these discs 44 is provided with punches, in the form of integral cone-shaped projections 45 evenly spaced about the circumference of the disc in a manner for suitable registry with the apertures 41 in the shell 33. The discs 44 are basically supported by a shaft 46 rigidly attached to brackets 47 adjustably associated with a structural member 48 permanently united to the frame 34. The shaft 46 is provided with an aperture 49 which, in cooperation with conduits 50 and 51 permits the circulation of cold water through the shaft 46 to prevent overheating of the perforating unit.

Rotatably positioned on the shaft 46 is a metallic sleeve 52 having a threaded portion at each end thereof. Over this sleeve 52 is fitted in tight engagement a sleeve 53 of rubber composition. This sleeve 53 provides yieldable means for supporting the perforating discs 44 and for permitting each of the discs to move slightly in a direction perpendicular to its axis of rotation, thus permitting each individual punch to adjust itself radially with respect to the apertures 41 of the shell 33. A nut 54 and washer 55 located on each end of the rubber sleeve 53 limit the axial adjustment of the sleeve 53 on the metallic sleeve 52 and provide means for compressing the rubber composition of the sleeve 53.

Before the rubber sleeve 53 is compressed, a group of individual spacer units is assembled thereon. These spacer units comprise a metal washer 56 located adjacent to each of the perforating discs 44, a rubber washer 57 located adjacent the metal washer 56, and a metal ring 58 located between the rubber sleeve 53 and each perforating disc 44 and serving as means upon which the perforating disc 44 may rotate. A special nut 59 also associated with each threaded end portion of the sleeve 52 serves to confine the perforating discs 44 with the washer assemblies in substantial alignment with the apertures 41 in the shell 33.

The perforating unit 42 or 43 is maintained in a predetermined relationship with the shell 33 by the projecting portions 45 of the perforating disc 44 in meshing engagement with the apertures 41 in the shell 33. As the shell 33 is rotated, its rotary movement correspondingly causes the perforating discs 44 to rotate. It will now be apparent that each of the discs 44 is cushioned in a sufficiently yieldable manner as to allow each of its individual projections 45 to adjust itself laterally or axially, radially and circumferentially in respect to the particular aperture 41 it engages during rotation of the shell 33; the rubber washers 57 being of such a resilient nature as to permit a limited degree of lateral or axial movement of adjacent perforating discs 44 relative to the apertures 41, while the sleeves 53 yieldingly provide the proper degree of compression for pressing the projections 45 of the perforating discs 44 against the marginal cutting edges of the apertures 41 during the perforating of the strip 21.

The nuts 54 located at opposite ends of the sleeve 52 may be adjusted to produce compression in the rubber sleeve 53. This compression forces the surface of the sleeve against the inner surfaces of the rings 58 and prevents the rings 58 from rotating with the perforating discs 44. The discs 44, however, are freely rotatable upon the outer surfaces of the rings 58.

As the rubber strip 21 moves with the shell 33, perforations are produced in the strip 21 by the units 42 and 43, and as shown in Fig. 2, the perforated strip then passes around an idler roll 60 and around a pressure roller 61 which positions and applies the strip in proper relationship upon the previously applied strip 24. An arm 62 pivoted to the frame 34 supports the roller 61 and a spring 63 maintains a proper degree of pressure of the roller 61 operating against the assembled strips.

Figure 1:
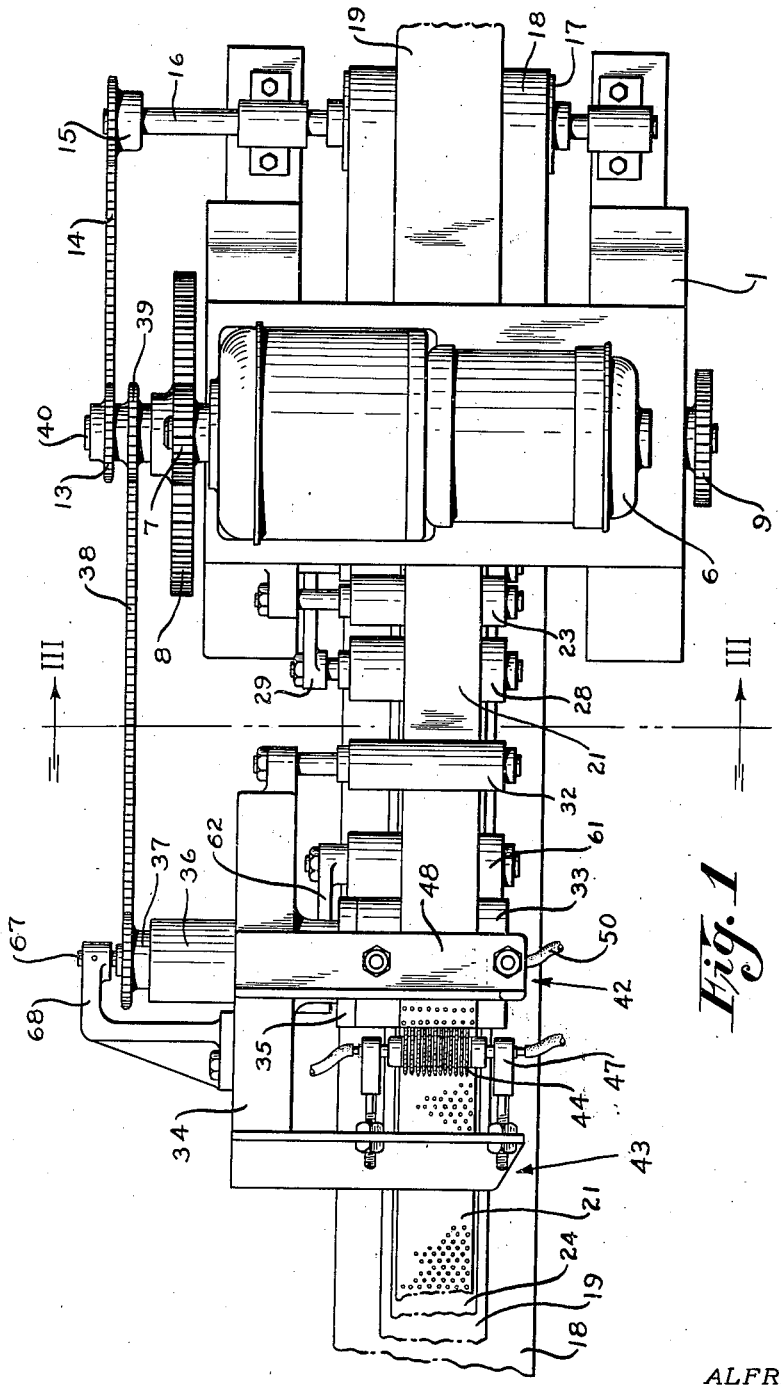
Fig. 1 is a plan view of a perforating machine and associated mechanism.

As the strip material 21 is perforated by the units 42 and 43, the material severed from the strip is forced progressively through the apertures 41 in the shell 33. Because the rubber stock being severed is unvulcanized it adheres tenaciously together. To remove this material from within the shell 33 (Figs. 2 and 4) means is provided in the form of a pair of shearing bars 64 and 65. These bars are located close to the inner surface of the shell 33 and are disposed in an angular or spiral manner so as to cut off the stock being forced through the apertures 41 and eject it from the open end of the shell 33. The shearing bars 64 and 65 are radially supported from a hub 66 attached to a shaft 67 passing through the center of the shell 33 and the center of the hub 35. As shown in Fig. 1, the end of the shaft 67 is held in a fixed position by being pinned with a bracket 68 fastened to the frame 34. The shaft 67 and shearing bars therefor remain stationary while the shearing effect therebetween is produced by the shell 33 rotating in relation to the shearing bars.

Fig. 6 illustrates a short section of a composite article, such as an unvulcanized reinforced rubber tubing for forming inner tubes, assembled in accordance with the practice of the present invention. The illustration shows the perforated stock 21 assembled on the strip of rubber 24 which, in turn, is adhered to the inner tube 19.

While the present invention shows one form of perforating rubber stock, it is to be understood that it is subject to variations, and such variations are contemplated as indicated in the scope of the appended claims.

Having thus described my invention, what I claim and desire to protect by Letters Patent is:

1. An apparatus for perforating plastic material comprising a rotatably mounted driven cylindrical shell having a plurality of spaced apertures extending through the wall thereof, the portion of the shell wall surrounding each aperture being formed as a continuous cutting edge, a rotatable disc positioned substantially in tangential relation to the shell, a plurality of spaced conically shaped projections carried by and extending from the disc for registry with the cutting edges in the shell wall, and resilient means for supporting the disc for limited lateral centering movement relative to said apertures.

2. An apparatus for perforating plastic material comprising a rotatably mounted driven cylindrical shell having a plurality of apertures extending through the wall thereof, a rotatable disc positioned in tangential relation with the shell, projections extending from the disc for registry with the apertures in the shell wall, resilient means for supporting the disc, and a shearing bar in a fixed position within the shell for removing material resulting from the perforating of the plastic strip.

3. An apparatus for perforating plastic material comprising a rotatably mounted driven cylindrical shell having a plurality of apertures extending through the wall thereof, a rotatable disc positioned in tangential relation with the shell, projections extending from the disc for registry with the apertures in the shell wall, resilient means for supporting the disc, and a spiral shearing bar in a fixed position within the shell for removing excess material resulting from the perforating of the plastic strip, the inclination of the spiral shearing bar relative to rotation of the shell being such as to discharge the excess material from the open end of the shell.

4. An apparatus for perforating plastic material comprising a rotatably mounted driven cylindrical shell having a plurality of apertures extending through the wall thereof, a disc positioned in tangential relation with the shell, projections extending from the disc for registry with the apertures in the shell wall, an axial support for the disc, resilient means operatively positioned between the disc and the axial support, and resilient means at each side of the disc for maintaining the normal axial position of the disc.

5. An apparatus for perforating plastic material comprising a rotatably mounted driven cylindrical shell having a plurality of apertures extending through the wall thereof, a disc positioned in tangential relation with the shell, projections extending from the disc for registry with the apertures in the shell wall, a disc supporting shaft in parallel relation with the axis of rotation of the shell, a sleeve rotatably mounted on the shaft, a rubber composition bushing positioned about the sleeve, and a ring supported by the bushing and about which the disc is adapted to rotate.

6. An apparatus for perforating plastic material comprising a rotatably mounted driven cylindrical shell having a plurality of apertures extending through the wall thereof, a disc positioned in tangential relation with the shell, projections extending from the disc for registry with the apertures in the shell wall, a disc supporting shaft in parallel relation with the axis of the shell, a sleeve rotatably mounted on the shaft, a rubber composition bushing positioned about the sleeve, a ring supported by the bushing and about which the disc is adapted to rotate, and means for compressing the rubber bushing.

7. An apparatus for perforating plastic material comprising a rotatably mounted driven cylindrical shell having a plurality of apertures extending through the wall thereof, a disc positioned in tangential relation with the shell, projections extending from the disc for registry with the apertures in the shell wall, a disc supporting shaft in parallel relation with the axis of the shell, a sleeve rotatably mounted on the shaft, a rubber composition bushing positioned about the sleeve, a ring supported by the bushing and about which the disc is adapted to rotate, and a rubber composition washer positioned at each side of the disc.

8. An apparatus for perforating plastic material comprising a rotatably mounted driven cylindrical shell having a plurality of apertures extending through the wall thereof, a disc positioned in tangential relation with the shell, projections extending from the disc for registry with the apertures in the shell wall, a disc supporting shaft in parallel relation with the axis of the shell, a sleeve rotatably mounted on the shaft, a rubber composition bushing positioned about the sleeve, a ring supported by the bushing and about which the disc is adapted to rotate, a rubber composition washer positioned at each side of the disc, and means for adjustably compressing the rubber washer.

9. An apparatus for perforating plastic material comprising a rotatably mounted driven cylindrical shell having a plurality of apertures extending through the wall thereof, a disc positioned in tangential relation with the shell, projections extending from the disc for registry with the apertures in the shell wall, a disc supporting shaft in parallel relation with the axis of the shell, a sleeve rotatably mounted on the shaft, a rubber composition bushing positioned about the sleeve, a ring supported by the bushing and about which the disc may rotate, a rubber composition washer positioned at each side of the disc, means for compressing the rubber bushing, and means for adjustably compressing the rubber washers.

10. An apparatus for perforating plastic material comprising a rotatably mounted driven cylindrical shell having a plurality of spaced apertures extending through the wall thereof, the portion of the shell wall surrounding each aperture being formed as a continuous cutting edge, a member rotatable on an axis parallel to the axis of the shell, a plurality of spaced projections extending from the members for registering with the cutting edges on the shell wall, an axial support for the member, and resilient mens operatively positioned between the member and the axial support for supporting said member for limited axial movement of said member relative to said apertures.

11. Apparatus for perforating plastic material comprising in combination a rotatable cylindrical shell having apertures therein, each aperture being surrounded by a cutting edge, a punch carrier rotatable on an axis parallel to the axis of rotation of the shell, punches on said carrier registering with said apertures, a sloping surface on each punch adapted to fit each cutting edge, and supporting means for the punch carrier including means yielding radially, axially, and circumferentially to force exerted on said surface by said cutting edge.

12. Apparatus for perforating plastic material comprising in combination a rotatable cylindrical shell having apertures therein, each aperture being surrounded by a cutting edge, a punch carrier rotatable on an axis parallel to the axis of rotation of the shell, punches on said carrier registering with said apertures, a sloping surface on each punch adapted to fit each cutting edge, and supporting means for the punch carrier including means for resiliently pressing the punch radially against the cutting edge, means for yieldingly holding the punch carrier in a given axial position on the supporting means, and means permitting circumferential movement of the punch carrier about the supporting means under force exerted on a punch surface by a cutting edge.

ALFRED N. IKNAYAN.